US007784099B2

(12) United States Patent
Benjamin (10) Patent No.: US 7,784,099 B2
(45) Date of Patent: Aug. 24, 2010

(54) SYSTEM FOR INTRUSION DETECTION AND VULNERABILITY ASSESSMENT IN A COMPUTER NETWORK USING SIMULATION AND MACHINE LEARNING

(75) Inventor: Paul Benjamin, Basking Ridge, NJ (US)

(73) Assignee: Pace University, New York, NY (US)

( * ) Notice: Subject to any disclaimer, the term of this patent is extended or adjusted under 35 U.S.C. 154(b) by 1219 days.

(21) Appl. No.: 11/358,165

(22) Filed: Feb. 21, 2006

(65) Prior Publication Data

US 2006/0191010 A1 Aug. 24, 2006

Related U.S. Application Data

(60) Provisional application No. 60/654,415, filed on Feb. 18, 2005.

(51) Int. Cl.
*G06F 12/14* (2006.01)
*G08B 23/00* (2006.01)

(52) U.S. Cl. .......................................... 726/25; 726/23
(58) Field of Classification Search .................. 726/25, 726/23
See application file for complete search history.

(56) References Cited

U.S. PATENT DOCUMENTS

| | | | |
|---|---|---|---|
| 5,961,644 A * | 10/1999 | Kurtzberg et al. ............. | 726/23 |
| 6,088,804 A * | 7/2000 | Hill et al. ...................... | 726/25 |
| 6,298,445 B1 * | 10/2001 | Shostack et al. .............. | 726/25 |
| 6,301,668 B1 * | 10/2001 | Gleichauf et al. ............. | 726/25 |
| 6,442,615 B1 * | 8/2002 | Nordenstam et al. ........ | 709/241 |
| 6,484,315 B1 * | 11/2002 | Ziese .......................... | 717/173 |
| 6,546,493 B1 * | 4/2003 | Magdych et al. ............. | 726/25 |
| 6,952,779 B1 * | 10/2005 | Cohen et al. ................. | 726/22 |
| 7,188,366 B2 * | 3/2007 | Chen et al. .................... | 726/23 |
| 7,315,801 B1 * | 1/2008 | Dowd et al. .................. | 703/13 |

(Continued)

OTHER PUBLICATIONS

Perumal, Archana, "Boar: An Autonomous Agent for Network Intrusion Detection Analysis" Dec. 2004, pp. i-41 (48 total pages).*

*Primary Examiner*—Michael Pyzocha
(74) *Attorney, Agent, or Firm*—Ostrolenk Faber LLP (57) ABSTRACT

The present invention provides a system and method for predicting and preventing unauthorized intrusion in a computer configuration. Preferably, the invention comprises a communication network to which at least two computing devices connect, wherein at least one of the computing devices is operable to receive data transmitted by the other computing device. The invention further comprises a database that is accessible over the network and operable to store information related to the network. A vulnerability assessment component is provided that is operable to execute a command over the communication network, and a data monitoring utility operates to monitor data transmitted over the communication network as the vulnerability assessment component executes commands. Also, an intrusion detection component is included that is operable to provide a simulated copy of the network, to generate a first data transmission on the simulated copy of the network that represents a second data transmission on the communication network, and to compare the first data transmission with a second data transmission. The vulnerability assessment component preferably interfaces with the intrusion detection component to define rules associated with the first and second data transmissions, to store the rules in the database, and to retrieve the rules from the database in order to predict and prevent unauthorized intrusion in the computer configuration.

19 Claims, 6 Drawing Sheets

U.S. PATENT DOCUMENTS

| | | | |
|---|---|---|---|
| 7,325,252 B2 * | 1/2008 | Bunker et al. | 726/25 |
| 7,424,746 B1 * | 9/2008 | Magdych et al. | 726/25 |
| 2002/0066034 A1 * | 5/2002 | Schlossberg et al. | 713/201 |
| 2002/0184528 A1 * | 12/2002 | Shevenell et al. | 713/201 |
| 2003/0110396 A1 * | 6/2003 | Lewis et al. | 713/201 |
| 2003/0182582 A1 * | 9/2003 | Park et al. | 713/201 |
| 2005/0197991 A1 * | 9/2005 | Wray et al. | 706/50 |
| 2006/0109793 A1 * | 5/2006 | Kim et al. | 370/250 |

* cited by examiner

SYSTEM FOR INTRUSION DETECTION AND VULNERABILITY ASSESSMENT IN A COMPUTER NETWORK USING SIMULATION AND MACHINE LEARNING

CROSS-REFERENCE TO RELATED APPLICATION

This application is based upon and claims priority to U.S. provisional patent application Ser. No. 60/654,415, filed Feb. 18, 2005, entitled SYSTEM FOR INTRUSION DETECTION AND VULNERABILITY ASSESSMENT IN A COMPUTER NETWORK USING SIMULATION AND MACHINE LEARNING, the entirety of which is incorporated herein by reference.

FIELD OF THE INVENTION

The present relates, generally, to computer network security and, more particularly, to assessing network vulnerability, detecting network intrusion, and to applying a learning mechanism to secure a network from intrusion.

BACKGROUND INFORMATION AND PRIOR ART

Computers and networks of computers are used by many businesses and other organizations to enable employees and other authorized users to access and exchange information. Often, computers that are connected to a local area network communicate with other computers that are not connected the network, such as by modem or other device via the Internet. In such cases, the local area network may be vulnerable to attacks by unauthorized users, who may be able to gain unauthorized access to files stored on computers on the local area network over a communication port of the computer communicating outside of the local area network.

As referred to herein, a "computer configuration" refers to a computing device, a networked computing device, components of a networked computing device, and/or hardware or software subsystems that make up a component of a networked computing device. Examples of computer networks include the Internet, Filter Distributed Data Interface ("FDDI"), and a token ring network, as known to one skilled in the art. A computing device may be a large-scaled ("mainframe") computer system, a mid-sized ("mini") computer, a personal computer, or any smaller processing device such as a handheld computer, a personal digital assistant ("PDA"), a cellular telephone, or the like. A computer configuration can include, for example, routers, switches, workstations, personal computers and printers. particular hardware types, operating systems, and application programs.

Two useful and known prior art systems that provide security against such attacks are vulnerability assessment systems and intrusion detection systems.

Vulnerability assessment systems detect weaknesses in a computer configuration or a computer network that could lead to unauthorized uses and associated exploits, collectively referred to herein generally, as vulnerabilities. Vulnerability assessment systems can be highly complex because the vulnerabilities associated with any given network can depend upon a version and configuration of the network, as well as upon the respective devices and subsystems coupled to the network. Additionally, networks can have vulnerabilities that arise from a single aspect of the system, and/or vulnerabilities that arise as a result of the interaction of multiple aspects of the system.

Current vulnerability assessment tools, typically, are single vendor solutions that address a single aspect of system vulnerability. These tools tend to fall into one of three types, each of which is briefly described below.

A first known type of vulnerability assessment tools relates to a database that documents particular vulnerabilities, and attempts to repair known vulnerabilities. Tools of this type are, typically, vendor-dependent for database updates, and also require that new product versions be installed or maintained, such as via a subscription service. Examples from this category include INTERNET SECURITY SYSTEMS' INTERNET SCANNER, NETWORK ASSOCIATES, INC.'s CYBERCOP and HARRIS' SECURITY THREAT AVOIDANCE TECHNOLOGY ("STAT").

A second known type of vulnerability assessment tools uses various data parameters to calculate a risk indicator. An example of this tool category is LOS ALAMOS VULNERABILITY ASSESSMENT (LAVA) tool. Unfortunately, these tools are difficult to maintain and keep current due to rapidly evolving threats and changing technology environments.

A third known type of vulnerability assessment tools examines a particular aspect of the system, such as the operating system or database management system, but ignores the other system components. An example of this tool is SYSTEM ADMINISTRATOR TOOL FOR ANALYZING NETWORKS ("SATAN"), which analyzes operating system vulnerabilities, but ignores infrastructure components such as routers.

In view of the above-identified shortcomings of the three respective types of vulnerability assessment tools, it is believed by the inventor that a plurality of these types of vulnerability assessment tools operating together would be preferable. Unfortunately, using multiple tools from a variety of vendors for a single computer network analysis is labor-intensive. For example, a security engineer must enter a description or representation of the configuration or network multiple times in various formats. The security engineer must also manually analyze, consolidate and/or merge outputs resulting from these disparate tools into a single report that describes the configuration's or network's security posture. Thereafter, the security engineer must complete a risk analysis (e.g., calculating expected annual loss, surveying controls, etc.), and repeat the entire process in order to analyze alternatives in view of the assessed security risks, system performance, mission functionality and/or available budget.

Another difficulty that stems from vulnerability assessment tools is the highly dynamic nature of a network environment. Devices of a known and/or unknown type can be added to and/or removed from a network essentially at any time. Additionally, different versions and types of subsystems can be introduced to a network. Each change or upgrade to a network increases a potential for new or changed vulnerabilities to exist on that network.

Current conventional systems that attempt to assess the vulnerability of computer systems are believed to be deficient for a variety of other reasons. For example, COMPUTER ORACLE AND PASSWORD SYSTEM ("COPS") is designed to probe for vulnerabilities on a host system. Unfortunately, COPS does not maintain information across an entire network and predicts vulnerabilities only on a single host. Other conventional systems, such as SATAN and INTERNET SECURITY SCANNER ("ISS"), scan computer systems for vulnerabilities by actively probing, analyzing collected data for vulnerabilities, and displaying the results. However, several disadvantages are associated with these products. In one example, data collection and analysis are implemented as a single process, which creates a prohibitively time-consuming process. Furthermore, SATAN AND ISS are essentially static applications, in that they do no learn over time as data collection and analysis occurs.

In addition to vulnerability assessment, intrusion detection involves the detection of unauthorized uses and exploits either in real-time (as they occur) or thereafter. Intrusion detection, however, is often compared to finding a needle in a haystack. The process involves generating extremely large amounts of data by network monitoring utilities, and identifying illegal or otherwise unlawful activities that may be identifiable only by a few anomalous data packets.

Typically, conventional intrusion detection systems operate in real-time, as they are designed to alert an operator of an intrusion attack so that the operator can respond in a timely fashion and avert damage. Unfortunately, the speed with which attacks are currently executed rarely allows time for any meaningful response from the operator, leaving a network vulnerable to an intrusion.

Intrusion detection systems are, typically, of three types: anomaly detection systems, rule-based systems, and signature-based systems, and are each discussed below.

Anomaly detection systems look for statistically anomalous behavior on a network. Statistical scenarios can be implemented for user, dataset, and program usage to detect anomalous or otherwise exceptional use of the system. However, the assumption that computer misuses appear statistically anomalous has been proven unreliable. Anomaly detection techniques do not directly detect misuse, and, accordingly, do not always detect many actual misuses. For example, when recordings or scripts of known attacks and misuses are replayed on computers with statistical anomaly detection systems, few if any of these scripts are identified as anomalous. This occurs for a variety of reasons and, unfortunately, reduces the accuracy and usefulness of anomaly detection systems.

In general, therefore, anomaly detection techniques cannot detect particular instances of misuse unless the specific behaviors associated with those instances satisfy statistical tests (e.g., regarding network data traffic or computer system activity) without security relevance. Anomaly detection techniques also produce false alarms. Many, if not most, of the reported anomalies are purely coincidental statistical exceptions and do not reflect actual security problems. Accordingly, a threat of false alarms often causes system managers to resist using anomaly detection methods due to an increase in the processing system workload and the need for expert oversight, and without providing substantial benefits.

Another limitation associated with anomaly detection techniques is that user activities are often too varied for a single scenario, resulting in many inferred security events and associated false alarms. Also, statistical measures are not sensitive to the sequential order in which events occur, and this may prevent detection of serious security violations that exist when events occur in a particular order. Furthermore, scenarios that anomaly detection techniques use may themselves be vulnerable to conscious manipulation by users. For example, a knowledgeable perpetrator may train the adaptive threshold of a detection system over time to accept aberrant behaviors as normal. Furthermore, statistical techniques that anomaly detection systems use often require complicated mathematical calculations and, therefore, are usually computationally intensive.

A second type of intrusion detection system, a rule-based system, has been applied in misuse detection, and generally operates as a layer "on top" of an anomaly detection system (as known in the art) for interpreting reports of anomalous behavior. Rule-based systems attempt to detect intrusions by receiving surveillance data supplied by a security system installed on a computer and then applying the data to a set of rules to determine potential scenarios that relate to attacking the computer installation. Since the underlying model is anomaly detection, rule-based systems have similar drawbacks as other anomaly detection techniques. It is believed by the inventor that rule-based systems are not fully satisfactory, since only those intrusions that correspond to previously been stored attack-scenarios are detected.

A third type of intrusion detection system is a signature-based or pattern-detection mechanism. In this third type of system, a signature is referenced that represents a set of events and transitions/functions that define a sequence of actions that form an attack or misuse. In general, a signature mechanism uses network sensors to detect data traffic or audit trail records, which are typically generated by a computer's operating system. Typically, the designer of a product which incorporates the signature-based mechanism identifies or selects a plurality of events that together form the signature or the attack or misuse. Although the signature-based mechanism goes a step beyond rule-based systems, a signature-based system is similar to a rule-based system in that it relies upon signatures or rules.

Importantly, intrusion detection methods in use today are plagued by false positive events, as well as by an inability to detect the early stages of a network attack. This is partly because conventional intrusion detection techniques are based on specialized equipment that is located at a customer's premise, and, accordingly may not determine a hacker's activities over a broader scale. Furthermore, the after-the-fact character of detection systems is dominated by forensic tools, i.e., utilities that are designed to help a computer security expert analyze what happened on a compromised host. Data are extracted that have been established as relevant to known attacks. This is believed by the inventor to be not helpful to prevent a system from becoming compromised and/or damaged.

Other shortfalls of existing intrusion detection systems include failing to utilize useful sources of data, producing large amounts of information that are difficult for a human to analyze in a timely fashion, being overly complex and difficult to use, and being designed to assist with system administration rather than attack diagnosis.

Thus, as described above, automatic vulnerability assessment systems and intrusion detection systems are time-consuming and complex. Vulnerability assessment systems typically include testing a machine's profile against a database of known vulnerabilities. Often, software updates, known in the art as "patches," are installed to ensure the machine remains protected against newly discovered vulnerabilities. However, installing patches on a machine does not guarantee that a specific machine is invulnerable. Merely installing patches lacks the ability to discover weaknesses in a specific machine's or network's configuration. In contrast, human vulnerability assessment experts can tailor their investigations to a specific configuration, but automatic assessments cannot.

Furthermore, known vulnerability assessment and intrusion detection problems require human-level intelligence to solve. Accordingly, researchers have attempted to apply artificial intelligence techniques to them. Although expert system and machine learning approaches in intrusion detection have been attempted with some success and a variety of approaches have been tried, no comprehensive effort has been made in the prior art to use human-level reasoning and learning capabilities in order to construct intelligent vulnerability assessment or intrusion detection systems.

SUMMARY OF THE INVENTION

A need exists for an intrusion detection system that can provide an early warning of potential misuses and intrusions with greater knowledge than can be obtained from detection at a single customer's premises. Early warning is preferably provided by specially examining detection events over a broader scale or scope, i.e., that of many aggregated customers or of the intervening network.

Accordingly the present invention provides a system and method for predicting and preventing unauthorized intrusion in a computer configuration. Preferably, the invention comprises a communication network to which at least two computing devices connect, wherein at least one of the computing devices is operable to receive data transmitted by the other computing device. The invention further comprises a database that is accessible over the network and operable to store information related to the network. A vulnerability assessment component is provided that is operable to execute a command over the communication network, and a data monitoring utility operates to monitor data transmitted over the communication network as the vulnerability assessment component executes commands.

Also in accordance with a preferred embodiment, an intrusion detection component is included that is operable to provide a simulated copy of the network, to generate a first data transmission on the simulated copy of the network that represents a second data transmission on the communication network, and to compare the first data transmission with a second data transmission. The vulnerability assessment component preferably interfaces with the intrusion detection component to define rules associated with the first and second data transmissions, to store the rules in the database, and to retrieve the rules from the database in order to predict and prevent unauthorized intrusion in the computer configuration.

These and other features and advantages of the present invention will become apparent from the following description of the invention that refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF THE PREFERRED EMBODIMENT

In accordance with the present invention, a system and method for vulnerability assessment and intrusion detection are disclosed that provide significant advantages over prior developed systems. The approach used by the present invention is very different from that taken by prior art vulnerability assessment or intrusion detection systems. In particular, the present invention performs vulnerability assessments by creating a virtual copy of a target machine, effectively creating a simulated machine, and subsequently attacking the simulated machine using a wide assortment of exploits. The present invention uses this same technique to perform intrusion detection. For example, when trying to understand a sequence of network packets, the present invention makes a virtual copy of the local portion of the network effectively creating a simulated network, and then attempts to generate the observed packets on the simulated network by performing various exploits. This approach may be initially slow, but the present invention preferably includes a learning ability that significantly speeds both the vulnerability assessment and intrusion detection features over time as the system gains experience.

Although the present invention is described with reference to particular modules and environments, other functionally equivalent methods and modules can be used, as known in the art.

In addition, the present invention preferably applies a general cognitive architecture that exhibits human-level performance for a wide range of tasks. In a preferred embodiment, a software application used and distributed in the industry under the name "SOAR" is used that operates as a general cognitive architecture for software applications, and integrates a number of cognitive capabilities, including, for example, a natural language application, learning, real-time response, emotion and concept learning. In the prior art, SOAR has been applied to such diverse tasks as tactical air warfare and robotics, both of which comprise tasks that, similar to network intrusion detection, involve large amounts of data.

In a preferred embodiment, the present invention integrates SOAR with a commercially available software product, "VMWARE." As known to those skilled in the art, VMWARE can be operated to create virtual copies of an actual network and/or computer system, and SOAR can explore how different computing events cause a network to evolve. For example, SOAR can recognize activity on a virtual network and then compares an actual network to the virtual network in order to verify or reject a hypothesis that a hacker has infiltrated. With experience, SOAR's learning mechanism enables it to predict and detect the presence of intruders with greater accuracy.

In particular, a method and system are provided that combine a intrusion detection component with a vulnerability assessment component in a computer network. The vulnerability assessment component preferably comprises a rule-based engine that is configured to perform a wide range of simulated user activities, both authorized and unauthorized, on the computer network and to record the results. Anomalous results are preferably reported to a network (or other) system administrator. The rule-based engine preferably uses explanation-based learning that improves the performance (i.e., speed) over time and with experience. The intrusion detection system component preferably comprises a vulnerability assessment engine and a simulation component, which constructs a virtual model of the local computer network effectively providing a simulated network. The intrusion detection system component preferably uses the vulnerability assessment engine to generate data packet streams in the simulated network and to compare the packet streams to data packets in the actual network. When the streams match, the intrusion detection component preferably labels the packet stream with the activities from the vulnerability assessment component, and reports any illegal activities to the network (or other) system administrator.

In accordance with one aspect of the present invention, the rule-based engine preferably executes a wide range of user activities on a computer or network. These activities may include lawful activities, such as downloading a web page, sending email, or pinging a device (as known in the art). Other activities may include questionable or otherwise unlawful activities, such as executing port scans, launching buffer overflow attacks or other exploits. The activities executed by the rule-based engine preferably include other activities known to one of ordinary skill in the art. Preferably, the rule-based system component executes various activities in a systematic fashion to search and explore for various aspects of a computer configuration or network. The activities are preferably organized according to one of the known standard search algorithms, such as depth-first search. In this way, the vulnerability assessment system component can explore the effects of individual activities, and also of various combinations of activities. When an exploit is successfully executed against one or more computers in the network, the rules used to execute the exploit are preferably generalized using explanation-based learning as known in the art.

In a preferred embodiment, a systematic exploration of a computer configuration or network is not performed just once, but multiple times in an ongoing process. Moreover, the vulnerability assessment system component is run regularly, either as a background process or at regular periods, such as on a nightly basis.

While the vulnerability assessment component is executing user activities, the data packets on the network are preferably monitored using a utility, such as TCPDUMP, as known in the art, and a pattern of packets generated by each user activity is preferably stored, generalized using explanation-based learning, and indexed by the activity. For example, a device is pinged, the packets generated by the pinging activity are generalized, and a new rule is stored in the system. The new rule indicates that whenever any sufficiently similar pattern of packets is detected, the activity of pinging is deduced. When the vulnerability assessment component succeeds in executing a questionable or otherwise unlawful activity, the computer configuration or network is not damaged, and the system administrator is notified of the weakness and corrective measures can be taken.

The present invention provides a technical advantage over the prior art in that vulnerability assessment tests for weaknesses can be performed for a single aspect of the system, and/or by a combination of aspects of the system. The vulnerability assessment feature of the present invention further promptly detects new weaknesses resulting from upgrades or modifications of a computer configuration or network hardware or software, and/or resulting from intentional, unintended, and/or accidental changes made to hardware or software.

Another technical advantage of the present invention is that the vulnerability assessment component preferably discovers new weaknesses that are caused by a combination of user activities and system configuration that have not been previously considered. Furthermore, the vulnerability assessment component of the present invention operates with minimal human supervision, because the systematic exploration of a computer configuration or network is performed automatically. Also, the speed of vulnerability assessment preferably increases as the vulnerability assessment component learns from experience.

As noted above, the present invention comprises an intrusion detection component that includes a rule-based engine to monitor actions of users of a computer configuration or network, e.g. by monitoring the packets on a computer network using TCPDUMP. The rules for the rule-based engine are preferably produced by the vulnerability assessment component, described above. For example, in case the vulnerability assessment component produces a rule that associates a particular pattern of network packets with executing a port scan, the rule is passed automatically to the intrusion detection component. Then, when a user executes a port scan that generates a similar pattern of packets in the future, the rule will "match" and "fire" (as known to one skilled in the art and familiar with SOAR), thereby causing the intrusion detection component to detect the port scan activity.

Another benefit of the present invention is a reduction in the number of false alarms. For example, the present invention rarely signals a possible unlawful activity, when no such activity exists. This is accomplished because alarms are triggered by rules created by the vulnerability assessment component, and only in such case when the pattern of data packets in the rule is associated with a predefined unlawful activity.

Yet another technical advantage of the present invention is that unlawful activities cannot be used to train the vulnerability assessment component by a malicious user. Unlike intrusion detection systems that are based largely on statistical analysis of user activity and, accordingly, can be trained to accept unlawful activity by a malicious user, the current invention does not rely on such analysis. Instead, the vulnerability assessment component determines which patterns of packets correspond to unlawful activities. Moreover, the present invention preferably detects new exploits that may be unknown in the research community or by those skilled in the art. This technical advantage results from an ability of the vulnerability assessment component to search among all combinations of user activities to identify system weaknesses.

According to yet another aspect of the present invention, the intrusion detection component operates with a simulator to simulate the activity of a computer configuration or network by creating virtual copies of computers and/or networks. For example, two commercial products, VMWARE from VMWARE.COM and VIRTUAL PC from MICROSOFT are used. When the intrusion detection component of the present invention encounters a sequence of packets that does not match any rule, the simulator is preferably invoked, as is the vulnerability assessment component, described above, in the virtual copy of the computer configuration and/or network. The vulnerability assessment component operates substantially as described above, and searches for a combination of user activities that produces packets encountered by the intrusion detection component. Once such a combination is found, the vulnerability assessment component preferably creates a new rule, as described above, which is immediately added to the intrusion detection component's rules so that the encountered packets can be recognized in the future. Thus, in accordance with a preferred embodiment, the intrusion detection component learns to recognize new types of activities that arise from user activities and/or combinations of user activities, and, furthermore learns such activities automatically from experience without a need for further human intervention.

Yet another technical advantage of the present invention is a simultaneous improvement of both the intrusion detection component and the vulnerability assessment component. For example, when the vulnerability assessment component finds a new weakness and, thereafter, creates a new rule, the rule is passed to the intrusion detection component. The intrusion detection component is improved to detect attacks against the new weakness. Also, when the intrusion detection component encounters a packet sequence, the intrusion detection component preferably invokes the vulnerability assessment component in the simulator to search for and/or create a new rule, which is similarly added to both systems.

Figure 1:
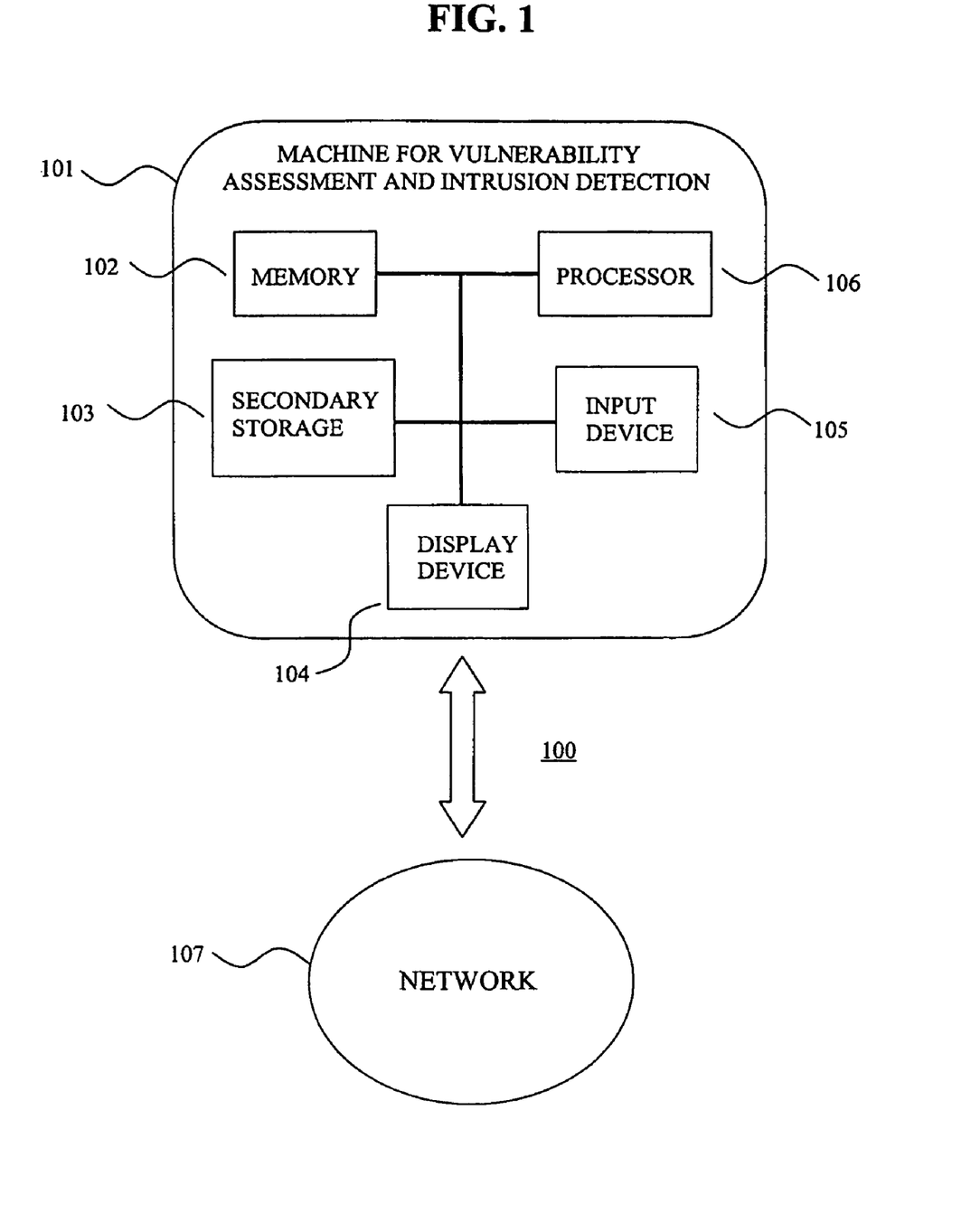
FIG. 1 is a diagram of an exemplary telecommunications signaling network and an associated machine for monitoring the network.

Referring now to the drawings, in which like reference numerals refer to like elements, FIG. 1 depicts a data processing system 100 suitable for practicing methods and systems in accordance with a preferred embodiment of the present invention. Data processing system 100 includes a machine 101 for intrusion detection and vulnerability analysis, connected to a network 107 such as a private or public telecommunications signaling network. Machine 101 preferably includes a memory 102, a secondary storage device 103, a display device 104, an input device 105, and a processor 106 such as a central processing unit. Memory 102 and secondary storage 103 may store applications and data for execution and use by processor 106. Input device 105 may be used to enter information and commands into machine 101, and display device 104 provides a visual of information in machine 101.

Although machine 101 is depicted in FIG. 1 with various components, one skilled in the art will appreciate that machine 101 can contain additional or different components. Additionally, although machine 101 is shown connected to network 107, machine 101 may be connected to other networks, including other wide area networks or local area networks. Furthermore, although aspects of the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet; or other forms of RAM or ROM. In addition, the computer-readable media may include instructions for controlling a computer system, such as machine 101, to perform a particular method. As used herein, the term, "module" refers, generally, to one or more discrete components that contribute to the effectiveness of the present invention. Modules can operate or, alternatively, depend upon one or more other modules in order to function.

Figure 2:
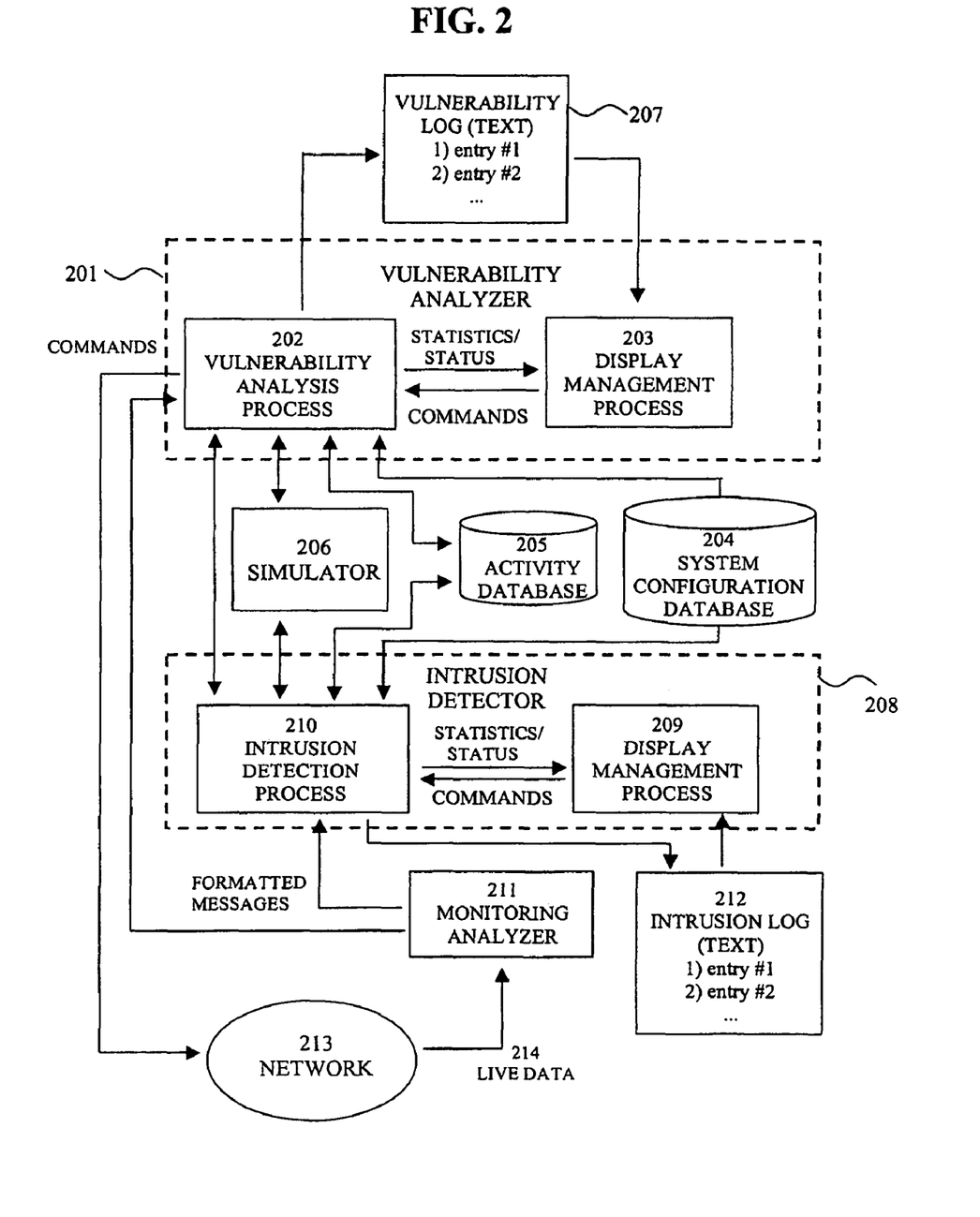
FIG. 2 is a diagram of software modules operating on the machine shown in FIG. 1 for implementing an embodiment consistent with the present invention.

FIG. 2 is a block diagram depicting example software modules operating on machine 101, as shown in FIG. 1, in accordance with an embodiment of the present invention, and referred to herein, generally, as vulnerability analysis and intrusion detection system 200. The modules include a vulnerability analyzer module 201 for vulnerability analysis and intrusion detector module 208 for intrusion detection of network 107. Further, monitoring analyzer module 211 preferably receives live data 214 from network 107. These data includes packets that are transmitted on network 107. Monitoring analyzer module 211 preferably formats the data for analysis and forwards it in so-called "real-time" to both the vulnerability analysis process module 202 and an intrusion detection process module 210.

A vulnerability analyzer module 201 includes a vulnerability analysis process module 202 and a display management process module 203. Vulnerability analysis process module 202 preferably receive network 107 configuration information from a system configuration database 204, and further receives activity descriptions from activity database 205. Vulnerability analysis module 202 preferably issues commands to a simulator 206 to construct a virtual copy of network 107 and its respective computers. The vulnerability analysis process module 202 preferably executes activities, such as described above, in a systematic order, for example, via commands issued to network 107 or to simulator module 206. The simulator module 206 preferably executes the activities on a virtual copy of the network, and preferably returns results of these activities to vulnerability analysis process module 202.

Thereafter, vulnerability analysis process module 202 preferably outputs the results of its analysis to a vulnerability log 207, which maintains a history of the processing, preferably as a time-stamped textual listing. The textual listing may be printed in hard copy form using a printer connected to machine 101, or may be displayed on display device 104. Vulnerability analysis process module 202 preferably also outputs the results to a display management process module 203. Vulnerability analysis process module 202 also preferably output the results of its analysis, including statistics and status information, to display process module 203. Display process module 203 preferably interfaces with a human being who administers the vulnerability analysis and intrusion detection system 200, who may enter commands that are relayed to vulnerability analysis process module 202.

System configuration database 204 preferably stores information representing a topology or interconnectivity of network 107, and/or configuration information of each computer connected to network 107. These computers correspond to system 100. System configuration database 204 may correspond to secondary storage 103, and may be implemented with a database product such as an Oracle database.

Activity database 205 stores descriptions of activities executable on network 213 or on computers connected to network 213. These computers correspond to system 100. Activity database 205 may correspond to secondary storage 103, and may be implemented with a database product such as an Oracle database.

Simulator 206 is a software module that creates virtual (i.e., software) copies of networks and computers. These virtual copies are preferably operable to execute any software that can be executed on a real (i.e., physical) network and computer that they are copies of. For example, simulator 206 may correspond to memory 102 or secondary storage 103, and may be implemented with a commercial simulation product such as VMWARE or VIRTUAL PC.

Continuing with reference to FIG. 2, intrusion detection analyzer 208 includes both an intrusion detection process module 210 and a display management process module 209. Intrusion detection process module 210 preferably operates to receive formatted messages from the monitoring analyzer 211, and performs processing of the messages to detect intrusion. In particular, module 208 receives system configuration information from system configuration database 204, and applies intrusion detection rules to the formatted messages in order to detect anomalies in the messages or other events that indicate an attempted intrusion into network 107, network 107 is configured. The intrinsic detection rules may be stored in memory such as memory 102 or secondary storage 103 in a database, or they may be implemented in hard-wired logic.

During or after performance of the intrusion detection processing, intrusion detection process module 210 preferably outputs the results to an intrusion log 212 that maintains a time-stamped history of the processing in the form of a textual listing, and it outputs the results, together with statistics and status information, to a display management process module 209. The textual listing may be printed in hard copy form using a printer connected to machine 101 or may be displayed on display device 104. Display process module 209 interfaces with a human being who administers the vulnerability analysis and intrusion detection system 200, who may decide to enter commands that are relayed to intrusion detection process module 210.

Further, the intrusion detection process module 210 may request that descriptions of activities are provided from activities database 205, and, thereafter, send commands to the vulnerability assessment process module 202 and to the simulator 206 to instruct the vulnerability assessment process module to execute specific activities on the virtual copy of the network. The intrusion detection process module 210 will receive the results of these simulated executions from the simulator 206.

Figure 3:
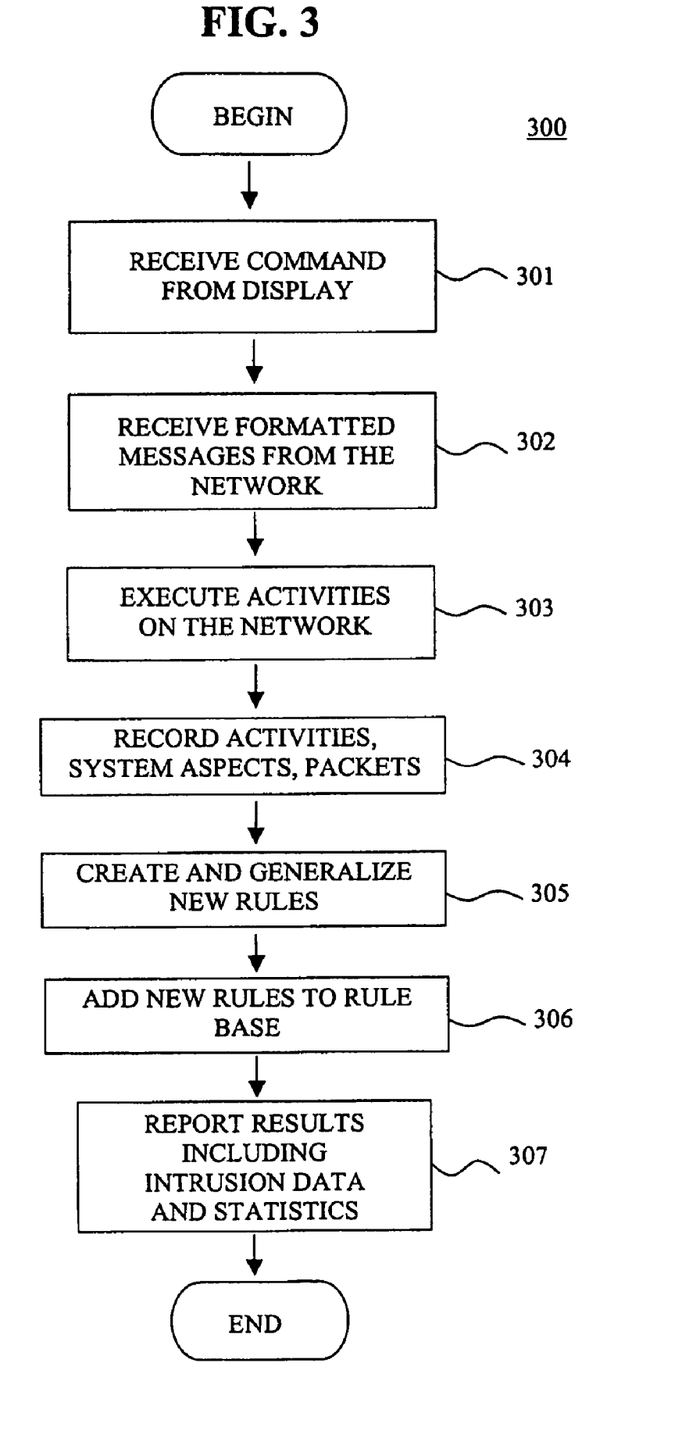
FIG. 3 is a flow chart of an exemplary process for determining vulnerability of a telecommunications signaling network to potential intrusion.

FIG. 3 is a flow chart illustrating steps associated with determining vulnerability of a telecommunications signaling network to potential intrusions. Preferably, process 300 is implemented on machine 101, and operates under control of vulnerability analyzer module 201. In process 300, the machine 101 preferably receives a command from the display management process module 203, which causes a vulnerability assessment of a physical network corresponding to network 107 to begin (step 301). In process 300, the formatted messages are received from the network 107, such as messages provided by monitoring analyzer module 211 (step 302). These messages include, for example, descriptions of packets that are transmitted on the network 107 during the vulnerability assessment process.

The command received from the display management process module 203 directs the execution of one or more activities on the network 107 (step 303). In step 303, the activities may be performed iteratively, such that the output from one particular activity may be input as the starting point for another activity. In this way, the system 200 may consider combinations of activities. While executing these activities, descriptions of the activities performed, descriptions of the aspects of the computer system and network that are examined, and the packets received from monitoring analyzer 211 during each activity are preferably recorded (step 304).

The information recorded in step 304 is preferably used to create one or more new rules, which are generalized using a standard form of explanation-based learning (step 305). The new rules may include new intrusion detection rules and new vulnerability assessments. New intrusion detection rules are preferably added for each executed activity and are of the form: "If packets, then activities", where "packets" refers to the packets detected on the physical network by monitoring analyzer 211 during the execution of the activities and recorded in step 304, and "activities" refers to the activities executed during step 303 and recorded in step 304. New vulnerability assessment rules are preferably added for each illegal activity that is successful, and are of the form: "If conditions, then weakness", where "conditions" refers to all the aspects of the network that were examined during the process of detecting a weakness (step 303), and "weakness" refers to the detected weakness.

These new rules are preferably added to the rule base (step 306). Thereafter, activity and activities are reported and may be displayed by display management process module 203, via intrusion log 207, in order to provide a visual indication of weaknesses of network 107 and/or the status of the network (step 307).

Figure 4:
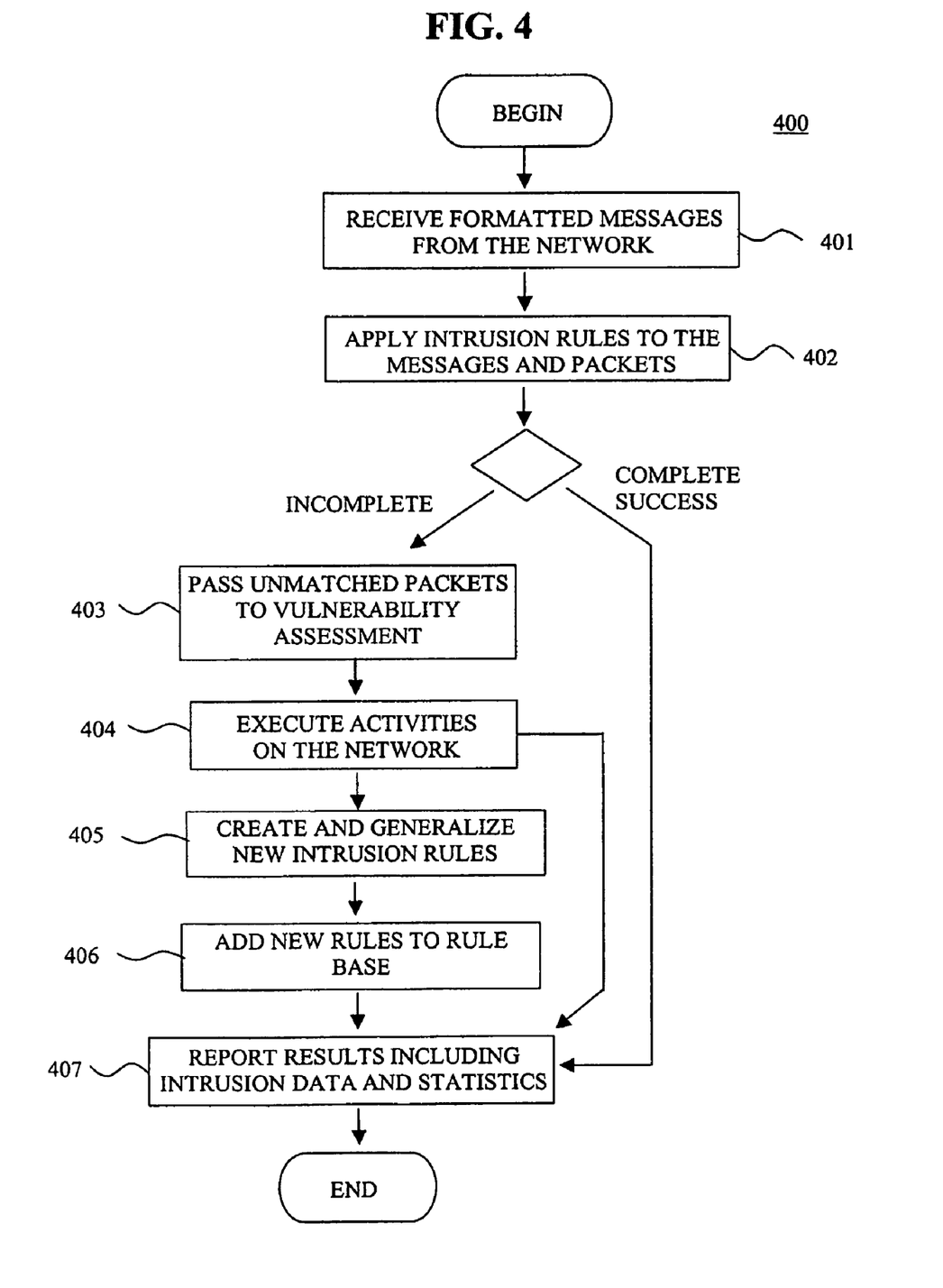
FIG. 4 is a flow chart of an exemplary process for monitoring a telecommunications signaling network for intrusion detection.

FIG. 4 is a flow chart illustrating steps associated with monitoring a telecommunications signaling network for intrusion detection in accordance with an example embodiment. Process 400 may be implemented on machine 101 operating under control of intrusion detector module 208. In process 400, formatted communication messages are preferably received from the network 107, such as messages and packet information provided by monitoring analyzer module 211 (step 401). Intrusion rules are preferably applied to the formatted messages and packet information by intrusion detection process module 210, in order to detect anomalies or other events in the network that indicate an attempted intrusion (step 402). If the rules successfully match all the packets provided by the monitoring analyzer 211, then the network packets are considered to be successfully explained, and the results are reported and/or displayed by display device 104, via intrusion log 212, to provide a visual indication of attempted intrusions into network 107 and potentially the status of the network (step 407).

Continuing with reference to FIG. 4, in case there are packets provided by the monitoring analyzer 211 that have not been matched by a rule, then those remaining unmatched packets are passed to the vulnerability analysis process module 202 (step 403). The vulnerability analysis process 300, described above, is preferably performed by applying a virtual copy of the network running on the simulator 206, instead of the physical network 213. As described above with regard to the vulnerability analysis process 300, activities are preferably performed on the virtual network (step 404). These activities may include both lawful and unlawful activities. Further, the process (step 404) may be performed iteratively, such that the output from one particular activity may be input as the starting point for another activity. In this way, the system may consider combinations of activities. While executing these activities, the process 400 compares packets observed on the virtual network with the packets passed to the vulnerability analysis process module 202 in step 403. When the packets match, the process, at step 404, terminates successfully and creates a new intrusion detection rule of the form: "If packets, then activities," where "packets" refers to the packets passed to the vulnerability analysis process module 202 in step 403, and "activities" refers to the activities executed during step 404 that generated the matching packets. This rule is created and generalized using a standard form of explanation-based learning (step 405). This new rule is added to the rule database (step 406) and the result is reported (step 407).

If the process (step 404) executes all the activities in activity database 205 without generating packets that match, it terminates unsuccessfully and reports the results (step 407).

The present invention is now described with reference to a particular embodiment that utilizes SOAR. SOAR is preferably taught how to attack networks and individual machines. Known network attacks are preferably ported into SOAR, for example, to be learned to attack a server and break into a network. This is necessary for SOAR to be able to learn to assess the vulnerabilities of the target machine, and also for SOAR to generate network packets that identify illegal network use, so that it can learn to detect intruders. SOAR is connected to TCPDUMP so that it can examine the network activity and learn concepts that describe illegal activities.

As known to one skilled in the art, SOAR is a unified cognitive architecture (Newell, 1990) originally developed at Carnegie-Mellon University and undergoing continuing development at a number of locations, including the University of Michigan and the Information Sciences Institute at the University of Southern California, as well as multiple locations in Europe. As a unified cognitive architecture, SOAR exhibits a wide range of capabilities, including learning to solve problems from experience, concept learning, use of natural language, and the ability to handle complex tasks.

Declarative knowledge in SOAR resides in its working memory, which contains all the facts SOAR knows at any instant. Procedural knowledge in SOAR is represented as operators, which are organized into problem spaces. Each problem space contains the operators relevant to interacting with some aspect of the system's environment. In accordance with the teachings herein, some problem spaces contain operators describing the actions of the present invention, such as executing a particular exploit. Other problem spaces contain operators that interact with the network, or analyze packets to construct user plans, or classify plans according to user goals. At each step, SOAR must choose one operator to execute. This operator will alter a computer's memory or interact with the network.

The basic problem-solving mechanism in SOAR is universal subgoaling (as known to one skilled in the art and familiar with SOAR): every time there is a choice of two or more operators, SOAR creates a subgoal to decide which to detect, and brings the entire knowledge of the system to bear on solving this subgoal by selecting a problem space and beginning to search. This search can itself encounter situations in which two or more operators can fire, which in turn causes subgoals to be created, etc. When an operator is successfully chosen, the corresponding subgoal has been solved and the entire solution process is summarized in a new operator, called a chunk, which contains the general conditions necessary for that operator to be chosen. This operator is added to the system, so that in similar future situations the search can be avoided. In this way, SOAR learns.

The SOAR publications extensively document how this learning method speeds up the system's response time in a manner that accurately models the speedup of human subjects on the same tasks.

One advantage of SOAR and utilized by the present invention is a computational model of discourse, in which SOAR interacts with a human using the English language. In this context, SOAR preferably performs two tasks: construct an explanation of an incoming utterance and generate an appropriate response. This approach uses "explanation based on generation," in which SOAR constructs an explanation for the incoming utterance by attempting to generate a similar utterance on its own. SOAR preferably searches among possible combinations of goals and expectations to try to generate this utterance, and when it succeeds in matching the utterance it assumes the human's goals and expectations are those that it had found. This gives SOAR an understanding of the goals of the person it is conversing with, so that SOAR chooses appropriate goals for generating a response. SOAR also forms a chunk for this search, so that a similar utterance in the future can be understood in a single step.

As noted above, the present invention combines vulnerability assessment and intrusion detection. It performs vulnerability assessment by generating attacks against virtual copies of machines, and performs intrusion detection by generating possible attacks against a simulated copy of itself. While performing vulnerability assessment, the present invention learns how to generate various behaviors on the network. These learned behaviors are then used during intrusion detection to try to model the goals of network users. Preferably, SOAR is connected both to a physical local area network (which it monitors using TCPDUMP) and to VMWARE. The present invention monitors data traffic on an actual network and attempts to find an operator that can explain the packets originating from a particular remote site in terms of a user acting in a particular way. If successful, a user identifier and activity is added to a model of the network (which resides in working memory). If, alternatively, the present invention fails to find an appropriate operator, the present invention creates a virtual copy of the local network and repeatedly attempts to replicate the observed activity by "firing" sequences of operators from problem spaces that model various user behaviors. In this way, the present invention searches to identify an acceptable explanation for the observations.

The above-described search can be extremely long, but once an explanation has been found, the present invention forms a "chunk" containing the general conditions necessary for this explanation. In the future this explanation is preferably made in a single step. The present invention thus models intrusion detection as plan recognition, and attempts to recognize users' plans and goals so that the invention can generate expectations about future user behavior. This approach is completely different than previous attempts to automate learning about intrusion detection which previously performed data mining and classification of network data without any capability to generate alternative data and associated comparisons. Furthermore, by actively modeling and reproducing user behavior, the present invention can explain legal network activity that it has never seen before, instead of flagging it as illegal.

Figure 5:
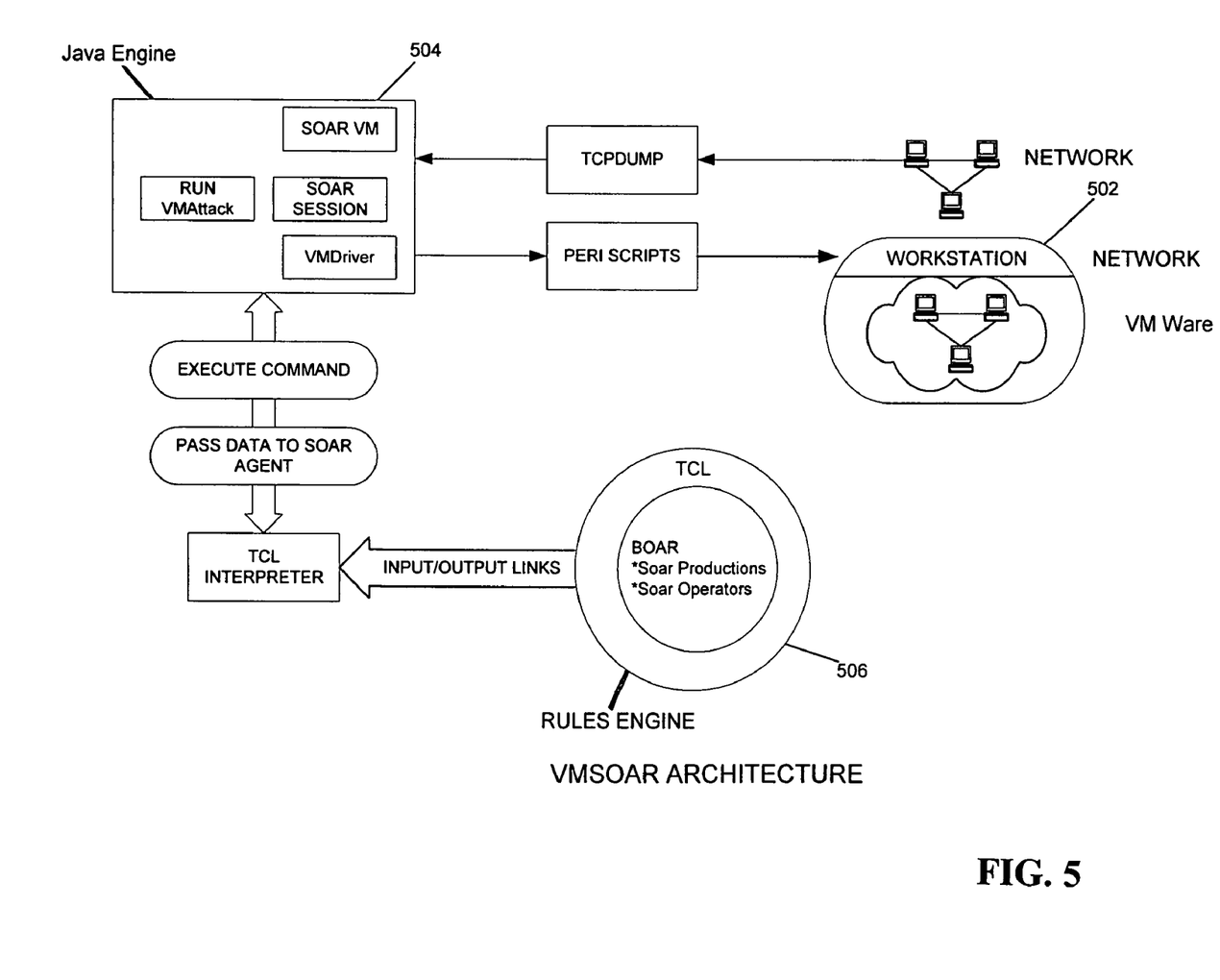
FIG. 5 is a block diagram illustrating components that interact in accordance with a preferred embodiment of the present invention.

The present invention attempts to define an architecture that is scaleable and flexible and can be extended. Referring now to FIG. 5, the present invention comprises three major components WorkStation Network 502, Engine 504 and Rules Engine 506. The WorkStation Network 502 preferably comprises a set of virtual machines that make up the virtual network. SOAR preferably executes network commands and attempts to stage an attack on the virtual network.

Engine 504 acts as a sort of glue to hold the WorkStation Network 502 and the Rules Engine 506 together. Engine 504 preferably comprises program class files that define, for example, the following operations: create and start the VMWARE machines; start a SOAR session and create the SOAR agent; execute a command on the VMWARE WorkStation Network 502 requested by the SOAR agent; pass data from the VMware WorkStation Network 502 back to the SOAR agent.

Rules Engine 506 preferably comprises a tool command language ("TCL") Interpreter, TCL scripts and SOAR rules that comprise an agent.

The following is an example scenario in which an attack is launched by the present invention. The exploit in the following example is based on a known vulnerability of MICROSOFT WINDOWS NT, the IIS Unicode Bug. The implementation used in this example possesses a number of problem spaces that perform different tasks including viewing a web page, downloading a file and launching an exploit against MICROSOFT WINDOWS NT. The present invention preferably launches this exploit from a computer system configured with the LINUX operating system. In the example below, the IP address 192.168.1.15 is used for the NT machine.

Figure 6:
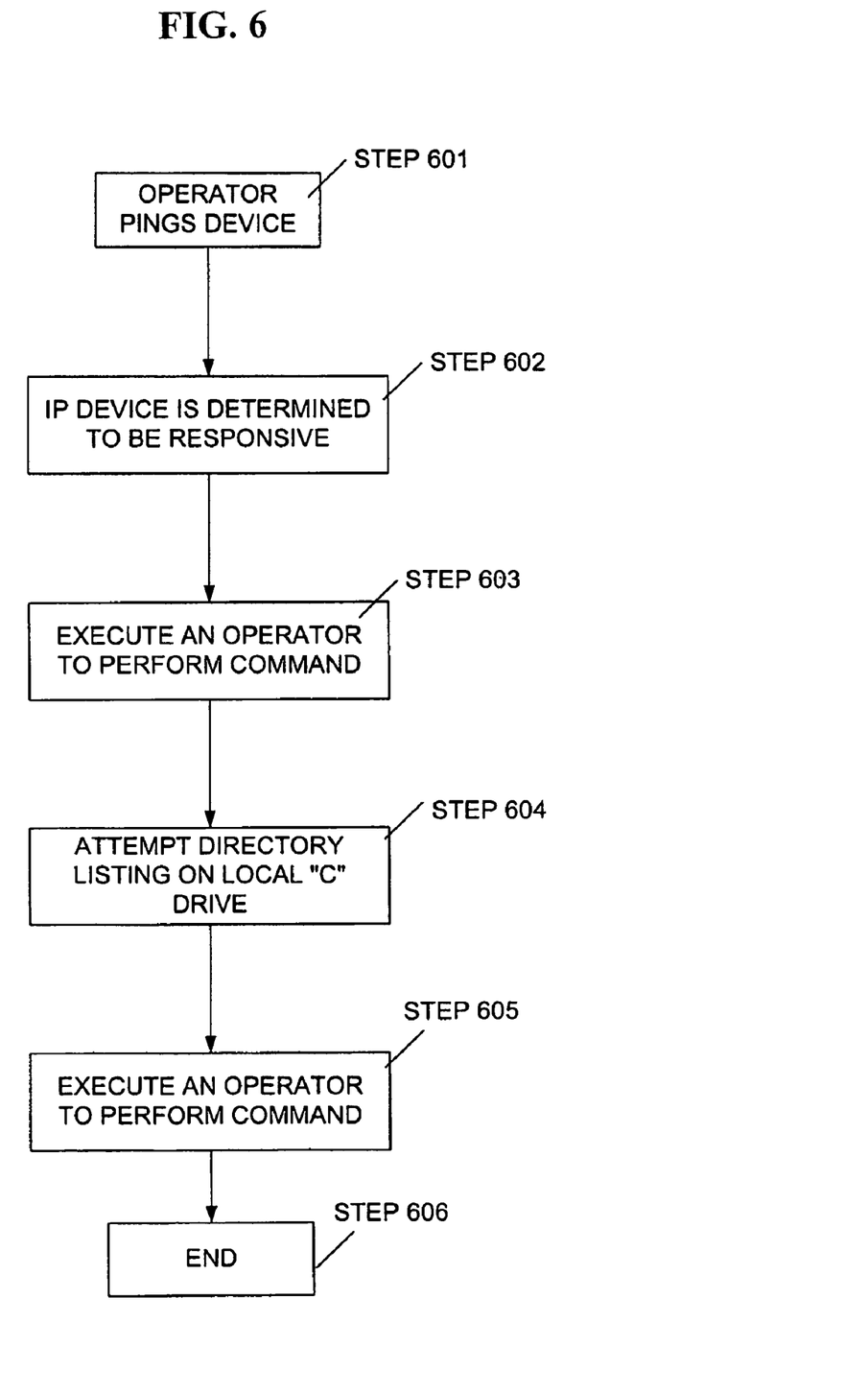
FIG. 6 is a flow chart illustrating steps associated with identifying data packets in accordance with the present invention.

The exploit comprises five overall steps, as illustrated in FIG. 6. In Step 601, an operator pings 192.168.1.15 determines if a machine is responsive at that address. If a reply is received, a working memory element is created that indicates the IP address is alive. In Step 602, if the IP is marked as alive, then the present invention executes an operator that performs the command: nmap -O 192.168.1.15. This command performs a port scan of the NT machine and returns a list of open ports. The present invention stores these ports in working memory and recognizes that HTTP port 80 is open, and may be running a web sever. The present invention further notices that a NETBIOS port is open, and based thereon, the present invention stores a prediction that the target OS is a version of WINDOWS. In Step 603, the present invention executes an operator that performs the following command: netcat -v -n 192.168.1.15 80 GET HTTP. This command returns the following . . . HTTP/1.1 400 Bad Request Server, indicating that the parameter is incorrect, and the present invention stores a message to this effect this in working memory.

Continuing the above example, the invention has deduced and caused operators to "fire" (as known in the art and to those familiar with SOAR) that WINDOWS NT is the operating system, and also that the computer is running IIS/4.0 on port 80. In Step 604, the present invention attempts to generate a directory listing of the computer's C: drive "local" by executing an operator that performs the following command: nc -v -n 192.168.1.15 80 GET http://192.168.1.15/scripts/..%255c../winnt/system32/cmd.exe?/c+dir+c:\. This command returns a directory listing of the C: drive on the NT machine.

Thus, the present invention executes operators that recognize a successful directory listing, and the present invention stores this fact in its working memory. In step 605, the present invention executes an operator that performs the following command:

nc -v -n 192.168.1.15 80 GET http://192.168.1.15/scripts/..%255c../winnt/system32/cmd.exe?//c+nc+-L+-p+10001+-d+-e+cmd.exe. This complex command executes a command on the NT IIS server: starts up "netcat" (known in the art) on the IIS server, with flags that tell Windows not to close netcat, but to wait for connections on port 10001, and to execute the command cmd.exe when a device connects to port 10001. In Step 606, the present invention executes an operator that performs the following command: nc -v -n 192.168.1.15 10001 which returns an NT prompt that can then perform virtually any command on the NT computer, thereby ending the process. Once the present invention has a problem space to launch this exploit, it can detect this vulnerability on NT servers on a network. Furthermore, it can use this knowledge to detect when an intruder is executing any portion of this exploit. For instance, suppose the present invention is protecting the NT machine and an intruder is attacking from another machine, which in the code below will be 192.168.1.14. When the intruder is executing the known SYN port scan as part of the above exploit, a series of data packets can appear on the network.

In this kind of port scan, the attacker determines which ports are available (i.e. being listened to by a service). Thereafter, a SYN packet is sent (as if to open a connection), and the target host responds with a SYN+ACK, indicating that the port is listening, and an RST indicates a non-listen. Subsequent scan results show that "http" port and "netbios" port are listening.

The present invention must explain various sequences of packets between the attacking device and the attacked device, but, initially, has no explanation that matches, so it "subgoals" and attempts to recreate this sequence of packets. In the subgoal, the present invention preferably uses VMWARE to construct a virtual copy of the device represented as 192.168.1.15, with the same basic (virtual) hardware and the same OS and services. In practice, this is done by storing a virtual image of every machine on the local network that the present invention is protecting. VMWARE just loads the stored image, which is considerably faster than creating a new one. The present invention then selects a problem space and executes operators in that space. In case operators connect legally to a webpage and download, the packets generated will not match the pattern of requests and acknowledgements in the above trace, so this problem space does not satisfy the subgoal, and a new problem space must be selected.

In this way, the present invention searches through its collection of problem spaces, and attempts to generate the observed pattern of packets.

Eventually, a problem space is used that executes a port scan. The space may be the space containing the above exploit, or any other space for an exploit that executes a similar port scan. When the operator that executes the port scan is chosen, it preferably generates the same pattern of requests, and the present invention concludes that the device identified as 192.168.1.14 is executing a port scan. The present invention learns at this point by constructing a chunk (a new rule) that summarizes the search that it preferably performed and the result. Briefly, SOAR forms chunks by tracing back through all the facts it examined in the process of its search and finding those that led to the result. SOAR puts all these facts on the left-hand side of a new rule, and puts the result of the search on the right-hand side of the new rule. This new rule will match any future situation that contains these same facts, which in this case will be any situation with the same pattern of requests and acknowledgements from one machine. SOAR will not have to search, but will immediately fire this rule and assert that the remote machine is executing a port scan. Over time, the present invention will learn to recognize a wide range of user behaviors.

Thus, the present invention will know only that 192.168.1.14 is scanning the ports. As the input from TCP-DUMP continues, the present invention identifies data packets, which the invention attempts to explain.

In order to explain the packets, the present invention performs various tasks, referred to in SOAR as "subgoaling." These include, for example, try downloading webpage; try connecting to mail server; try limewire peer-to-peer; try IIS Unicode exploit; or the like.

This part of the log reflects an invalid combination of flags. There are certain combination of TCP flags known in the art that are considered invalid. In the above example, two invalid combinations, such as "SE", "SFP" are noted. A host must not set ECT on SYN or SYN-ACK packets. In a preferred embodiment, the present invention is deliberately not programmed with knowledge about specific combinations of invalid flags, which is the typical prior art approach to intrusion detection. Instead, the present invention generates the behavior to explain. As above, the present invention does not initially possess any matching pattern for this illegal combination of flags, and performs a search just as before through all its problem spaces to find one whose operators will generate this pattern. The IIS Unicode exploit problem space will eventually be used, and ill generate the pattern of SE and SFP occurring at exactly the same timestamp, and the present invention will conclude that a user at the device represented by 192.168.1.14 is executing this exploit, and notify the system administrator of the attack. The present invention will also learn a chunk summarizing this pattern.

The foregoing description of the preferred embodiment of the invention has been presented for the purposes of illustration and description. It is not intended to be exhaustive or to limit the invention to the precise form disclosed. Many modifications and variations are possible in light of the above teaching, and will be readily apparent to those skilled in the art, and this application is intended to cover any adaptations or variations thereof. For example, different intrusion rules, different vulnerability rules, other types of user interfaces and hardware for presenting the user interfaces, and other types of programming languages for implementing an embodiment consistent with the present invention, may be used without departing from the scope of the invention. It is intended that the scope of the invention be limited not by this detailed description, but is to be given the full scope afforded by language in the claims.

What is claimed is:

1. A system for predicting and preventing unauthorized intrusion in a computer configuration comprising at least one of a computing device and a communication network, the system comprising:
    the communication network to which at least two computing devices connect, wherein at least one of the computing devices is operable to receive data transmitted by the other computing device;
    a database accessible over the network and operable to store information related to the network;
    a vulnerability assessment component that is operable to execute a command over the communication network;
    a data monitoring utility that is operable to monitor data transmitted over the communication network as the vulnerability assessment component executes commands; and
    an intrusion detection component that is operable to provide a simulated copy of the network, to generate a first data transmission on the simulated copy of the network that represents a second data transmission transmitted on the communication network, and to compare the first data transmission with the second data transmission;
    wherein the vulnerability assessment component interfaces with the intrusion detection component to define rules associated with the first and second data transmissions, to store the rules in the database, and to retrieve the rules from the database in order to predict and prevent unauthorized intrusion in the computer configuration.

2. The system of claim 1, wherein the vulnerability assessment component executes a command that exposes a weakness of a single aspect of at least one computing device.

3. The system of claim 1, further comprising an explanation-based learning component operable to generalize the comparison made by the intrusion detection component.

4. The system of claim 1, wherein the vulnerability assessment component further comprises a cognitive architecture component that provides cognitive capabilities.

5. The system of claim 4, wherein the cognitive capabilities include at least one of applying a natural language, learning, real-time responses, emotion and/or concept learning.

6. The system of claim 4, wherein the cognitive architecture is SOAR.

7. The system of claim 1, wherein the vulnerability assessment component further comprises a rule-base engine that is operable to execute authorized and/or unauthorized commands on the computer network, and is further to record the results thereof.

8. The system of claim 7, wherein the authorized activities comprise one or more of downloading a web page, sending e-mail and pinging a device and the unauthorized activities comprise one or more of executing port scans, launching buffer overflow attacks and remote control activity.

9. The system of claim 1, wherein the vulnerability assessment component detects vulnerability caused by an upgrade to a computing device or network device, a modification of a computing device or an network device, and/or the addition, modification or subtraction of software.

10. The system of claim 1, wherein the vulnerability assessment component is operable to determine data transmissions that represent unauthorized activity.

11. A method for predicting and preventing unauthorized intrusion in a computer configuration comprising at least one of a computing device and a communication network, the system comprising:
    providing a database accessible over the communication network and operable to store information related to the network;
    executing a command over the communication network;
    monitoring data transmitted over the communication network as the command is executed; and
    providing a simulated copy of the network, generating a first data transmission on the simulated copy of the network that represents a second data transmission transmitted on the communication network, and comparing the first data transmission to the second data transmission;
    defining rules associated with the first and second data transmissions, storing the rules in the database, and retrieving the rules from the database in order to predict and prevent unauthorized intrusion in the computer configuration.

12. The method of claim 11, wherein the executed command on the network exposes a weakness of a single aspect of at least one computing device.

13. The method of claim 11, further comprising generalizing the comparison of the first data transmission to the second data transmission.

14. The method of claim 11, further comprising providing cognitive capabilities.

15. The method of claim 14, wherein the cognitive capabilities include a natural language application, learning, real-time responses, emotion and/or concept learning.

16. The method of claim 11, further comprising executing authorized and/or unauthorized commands on the computer network, and recording the results thereof 17. The method of claim 16, wherein the authorized activities comprise one or more of downloading a web page, sending e-mail and pinging a device and the unauthorized activities comprises one or more of executing port scans, launching buffer overflow attacks and remote control activity.

18. The method of claim 11, further comprising detecting vulnerability caused by an upgrade to a computing device or network device, a modification of a computing device or an network device, and/or the addition, modification or subtraction of software.

19. The method of claim 11, further comprising determining data transmissions that represent unauthorized activity.

* * * * *